(12) United States Patent
Aida et al.

US011411214B2

(10) Patent No.: US 11,411,214 B2
(45) Date of Patent: *Aug. 9, 2022

(54) POSITIVE ELECTRODE ACTIVE MATERIAL FOR NONAQUEOUS ELECTROLYTE SECONDARY BATTERIES, PRODUCTION METHOD THEREOF, POSITIVE ELECTRODE MIXTURE MATERIAL PASTE FOR NONAQUEOUS ELECTROLYTE SECONDARY BATTERIES, AND NONAQUEOUS ELECTROLYTE SECONDARY BATTERY

(71) Applicant: SUMITOMO METAL MINING CO., LTD., Tokyo (JP)

(72) Inventors: Taira Aida, Niihama (JP); Jiro Okada, Niihama (JP); Tetsufumi Komukai, Niihama (JP); Koji Yamaji, Niihama (JP); Ryozo Ushio, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 61 days.

This patent is subject to a terminal disclaimer.

(21) Appl. No.: 15/771,427

(22) PCT Filed: Sep. 30, 2016

(86) PCT No.: PCT/JP2016/079133
§ 371 (c)(1),
(2) Date: Oct. 17, 2018

(87) PCT Pub. No.: WO2017/073238
PCT Pub. Date: May 4, 2017

(65) Prior Publication Data
US 2019/0036112 A1   Jan. 31, 2019

(30) Foreign Application Priority Data

Oct. 28, 2015 (JP) .............................. JP2015-212239
Nov. 27, 2015 (JP) .............................. JP2015-231220
Feb. 26, 2016 (JP) .............................. JP2016-035788
Aug. 29, 2016 (JP) .............................. JP2016-166489

(51) Int. Cl.
| | |
|---|---|
| H01M 4/36 | (2006.01) |
| C01G 53/00 | (2006.01) |
| C01G 41/00 | (2006.01) |
| H01M 4/525 | (2010.01) |
| H01M 4/505 | (2010.01) |
| H01M 10/0525 | (2010.01) |
| H01M 4/02 | (2006.01) |

(52) U.S. Cl.
CPC .......... H01M 4/366 (2013.01); C01G 41/00 (2013.01); C01G 53/50 (2013.01); H01M 4/505 (2013.01); H01M 4/525 (2013.01); C01P 2002/72 (2013.01); C01P 2004/50 (2013.01); C01P 2004/51 (2013.01); C01P 2004/61 (2013.01); C01P 2004/84 (2013.01); C01P 2006/12 (2013.01); C01P 2006/40 (2013.01); H01M 10/0525 (2013.01); H01M 2004/021 (2013.01); H01M 2004/028 (2013.01)

(58) Field of Classification Search
None
See application file for complete search history.

(56) References Cited

U.S. PATENT DOCUMENTS

| | | |
|---|---|---|
| 2011/0315918 A1 | 12/2011 | Kawai et al. |
| 2012/0282525 A1 | 11/2012 | Nagai et al. |
| 2013/0011331 A1 | 1/2013 | Nagai et al. |
| 2013/0302687 A1 | 11/2013 | Nagai et al. |
| 2014/0011090 A1 | 1/2014 | Toya et al. |

(Continued)

FOREIGN PATENT DOCUMENTS

| | | |
|---|---|---|
| JP | 2003-31222 A | 1/2003 |
| JP | 2010-40383 A | 2/2010 |

(Continued)

OTHER PUBLICATIONS

International Search Report dated Nov. 22, 2016, issued in counterpart International Application No. PCT/JP2016/079133, with English translation. (5 pages).

(Continued)

*Primary Examiner* — Tanisha Diggs
(74) *Attorney, Agent, or Firm* — WHDA, LLP

(57) ABSTRACT

A positive electrode active material for nonaqueous electrolyte secondary batteries and production method thereof that are able to improve the stability of positive electrode mixture material pastes used to produce nonaqueous electrolyte secondary batteries, as well as to improve the output characteristics and charge/discharge cycle characteristics of secondary batteries. A method for producing a positive electrode active material for nonaqueous electrolyte secondary batteries includes mixing a fired powder formed of a lithium-metal composite oxide having a layered crystal structure, a first compound which is at least one selected from a group consisting of a lithium-free oxide, a hydrate of the oxide, and a lithium-free inorganic acid salt, and water and drying a mixture resulting from the mixing. The fired powder includes secondary particles formed by agglomeration of primary particles. The first compound reacts with lithium ions in the presence of water to form a second compound including lithium.

17 Claims, 6 Drawing Sheets

(56) References Cited

U.S. PATENT DOCUMENTS

| | | | |
|---|---|---|---|
| 2015/0194662 A1* | 7/2015 | Yang | H01M 4/525 429/223 |
| 2015/0228974 A1 | 8/2015 | Kokado et al. | |
| 2016/0093885 A1 | 3/2016 | Kamata et al. | |
| 2016/0211519 A1* | 7/2016 | Uchiyama | H01M 4/0471 |
| 2017/0141391 A1* | 5/2017 | Jito | H01M 4/362 |

FOREIGN PATENT DOCUMENTS

| | | |
|---|---|---|
| JP | 2011-119092 A | 6/2011 |
| JP | 2012-28313 A | 2/2012 |
| JP | 2012-79464 A | 4/2012 |
| JP | 2012-256435 A | 12/2012 |
| JP | 2013-73779 A | 4/2013 |
| JP | 2013-84395 A | 5/2013 |
| JP | 2013-125732 A | 6/2013 |
| JP | 2013-152866 A | 8/2013 |
| JP | 2013152866 A * | 8/2013 |
| JP | 2015-88343 A | 5/2015 |
| WO | 2012/131881 A1 | 10/2012 |
| WO | 2014/181891 A1 | 11/2014 |
| WO | WO 2016017093 * | 2/2016 |

OTHER PUBLICATIONS

International Preliminary Report on Patentability (Form PCT/IB/373) dated May 1, 2018, issued in counterpart International Application No. PCT/JP2016/079133, with Form PCT/ISA/237; with English translation. (9 pages).

Office Action dated Oct. 13, 2020, issued in counterpart Japanese Application No. 2017-547685 (w/ English translation; 10 pages).

Office Action dated Apr. 27, 2021, issued in counterpart Japanese Application No. 2017-547685 (w/ English translation; 8 pages).

* cited by examiner

POSITIVE ELECTRODE ACTIVE MATERIAL FOR NONAQUEOUS ELECTROLYTE SECONDARY BATTERIES, PRODUCTION METHOD THEREOF, POSITIVE ELECTRODE MIXTURE MATERIAL PASTE FOR NONAQUEOUS ELECTROLYTE SECONDARY BATTERIES, AND NONAQUEOUS ELECTROLYTE SECONDARY BATTERY

TECHNICAL FIELD

With the recent wide spread use of portable electronic devices, such as mobile phones and notebook personal computers, there has been a strong demand to develop small, light nonaqueous electrolyte secondary batteries having high energy density. There has been also a strong demand to develop secondary batteries having excellent output characteristics and charge/discharge cycle characteristics as batteries for electric vehicles, such as hybrid vehicles.

Among secondary batteries that satisfy these demands are nonaqueous electrolyte secondary batteries, such as lithium-ion secondary batteries. A nonaqueous electrolyte secondary battery includes a negative electrode, a positive electrode, a nonaqueous electrolyte solution, and the like and uses, for example, materials capable of inserting and de-inserting lithium as negative and positive electrode active materials.

Nonaqueous electrolyte secondary batteries are currently actively being researched and developed. Among others, nonaqueous electrolyte secondary batteries using a layered or spinel lithium-metal composite oxide as a positive electrode active material output a 4V-class high voltage and therefore are being commercialized as batteries having high energy density.

Among main positive electrode active materials that have been proposed are lithium-cobalt composite oxides (LiCoO$_2$), which are synthesized relatively easily, lithium-nickel composite oxides (LiNiO$_2$), which use nickel, which is cheaper than cobalt, lithium-nickel-cobalt-manganese composite oxides (LiNi$_{1/3}$Co$_{1/3}$Mn$_{1/3}$O$_2$), and lithium-manganese composite oxides (LiMn$_2$O$_4$), which uses manganese. One example approach known to be effective in further improving charge/discharge cycle characteristics is to include a greater amount of lithium than that in the stoichiometric composition with respect to a metal element such as nickel, cobalt, or manganese.

The positive electrode of a nonaqueous electrolyte secondary battery is formed, for example, by mixing a positive electrode active material, a binder such as polyvinylidene fluoride (PVDF), and a solvent such as N-methyl-2-pyrrolidone (NMP) to obtain a positive electrode mixture material paste and applying the paste to a collector such as an aluminum foil. At this time, lithium liberated from the positive electrode active material in the positive electrode mixture material paste may react with water included in the binder or the like to form lithium hydroxide. The lithium hydroxide formed may react with the binder, causing gelling of the positive electrode mixture material paste. The gelling of the positive electrode mixture material paste degrades operability or reduces yield. This tendency is remarkable if the amount of lithium in the positive electrode active material is greater than that at the stoichiometric ratio and the proportion of nickel is high.

Some attempts have been made to suppress gelling of a positive electrode mixture material paste. For example, Patent Literature 1 proposes a positive electrode composition for nonaqueous electrolyte secondary batteries including a positive electrode active material formed of a lithium-transition-metal composite oxide and additional particles consisting of acidic oxide particles. Patent Literature 1 states that this positive electrode composition suppresses the reaction between hydroxide formed by reaction with water included in a binder and the binder by causing the lithium hydroxide to preferentially react with an acidic oxide and thus suppresses gelling of the positive electrode mixture material paste. Patent Literature 1 also states that the acidic oxide functions as a conductive material in the positive electrode, reduces the resistance of the entire positive electrode, and contributes to an improvement in the output characteristics of the battery.

Patent Literature 2 proposes a lithium-ion secondary battery production method including preparing, as a positive electrode active material, a lithium-transition metal oxide including LiOH outside the composition; grasping the molar amount P of LiOH included in 1 g of the positive electrode active material; preparing 0.05 mol or more of tungsten oxide per mol of LiOH on a tungsten atom basis with respect to the molar amount P of LiOH; and preparing a positive electrode paste by kneading the positive electrode active material and tungsten oxide along with a conductive material and a binder using an organic solvent.

On the other hand, attempts have been made to obtain lithium-ion secondary batteries having excellent output characteristics and charge/discharge cycle characteristics. For example, a positive electrode active material consisting of particles having small sizes and a narrow particle size distribution is known to have excellent output characteristics and charge/discharge cycle characteristics for the reasons below. Particles having small sizes have a large specific surface area. If such particles are used as a positive electrode active material, the particles can react with an electrolyte solution in a sufficiently great surface area. Also, the particles form a thin positive electrode such that the lithium-ion moving distance between the positive electrode and the negative electrode can be reduced. Thus, the positive electrode resistance can be reduced. Also, particles having a narrow particle size distribution are able to make uniform the voltages applied to the particles in the electrode. Thus, a reduction in the battery capacity due to selective degradation of particles can be suppressed.

Also, it has been reported that use of a hollow positive electrode active material is effective in further improving output characteristics and charge/discharge cycle characteristics. A hollow positive electrode active material can react with an electrolyte solution in a greater surface area than a solid positive electrode active material having similar particle sizes. Thus, the positive electrode resistance can be significantly reduced.

For example, Patent Literatures 3, 4 disclose methods of producing transition-metal composite hydroxide particles serving as a precursor of a positive electrode active material by causing crystallization reaction in clearly separated two steps consisting of a nucleus formation step in which nucleus formation is mainly performed and a particle growth step in which particle growth is mainly performed. In these methods, the pH value of an aqueous reaction solution on a 25° C. solution temperature basis is controlled within a range of 12 or more (e.g., 12.0 to 13.4 or 12.0 to 14.0) in the nucleus formation step and is controlled within a range lower than that in the nucleus formation step and equal to 12 or less (e.g., 10.5 to 12.0) in the particle growth step. In both the nucleus formation and particle growth steps, an oxidizing atmosphere is initially used as a reaction atmosphere and is changed to a non-oxidizing atmosphere at a predetermined timing.

Transition-metal composite hydroxide particles obtained using these methods have small particle sizes and a narrow particle size distribution and each include a low-density central portion consisting of small primary particles and a high-density shell consisting of sheet-shaped or needle-shaped primary particles. When such transition-metal composite hydroxide particles are fired, the low-density central portion contracts, forming a space within. The properties of the composite hydroxide particles are inherited by a positive electrode active material. These Patent Literatures state that a secondary battery using such a positive electrode active material can improve capacity characteristics, output characteristics, and charge/discharge cycle characteristics.

With respect to an improvement in output characteristics, for example, Patent Literature 5 proposes a method for producing a positive electrode active material for nonaqueous electrolyte secondary batteries including a first step of adding and mixing an alkali solution in which a tungsten compound is dissolved, to a lithium-metal composite oxide powder consisting of primary particles and secondary particles formed by agglomeration of the primary particles to disperse W on the surface of the lithium-metal composite oxide powder or on the surface of the primary particles of the powder and a second step of heat-treating the mixture to form particles including W and Li on the surface of the lithium-metal composite oxide powder or on the surface of the primary particles of the powder.

This proposal states that if a positive electrode active material obtained using this method is used in a nonaqueous electrolyte secondary battery, high capacity and high output can be achieved. However, this proposal does not consider suppression of gelling of a positive electrode mixture material paste, although it considers the increase in output.

CITATION LIST

Patent Literature

[Patent Literature 1] Japanese Unexamined Patent Application Publication No. 2012-28313
[Patent Literature 2] Japanese Unexamined Patent Application Publication No. 2013-84395
[Patent Literature 3] International Publication WO2012/131881
[Patent Literature 4] International Publication WO2012/181891
[Patent Literature 5] Japanese Unexamined Patent Application Publication No. 2012-079464

SUMMARY OF THE INVENTION

Technical Problem

Unfortunately, the composition proposed in Patent Literature 1 generates the residual particles of the acidic oxide, which then may damage the separator and thus reduce safety. Also, this composition does not seem to sufficiently suppress gelling. Also, the proposal of Patent Literature 2 does not seem to have solved the problem of the damage to the separator by the residual acidic oxide (tungsten oxide) or the problem relating to suppression of gelling.

Also, if the area of the surface that reacts with the electrolyte solution is increased to improve output characteristics and charge/discharge cycle characteristics, as proposed in Patent Literatures 3 and 4, there may occur a new problem of proceeding of gelling of the positive electrode mixture material paste. Also, further improvements in output characteristics and charge/discharge cycle characteristics are required. The proposal of Patent Literature 5 does not consider suppression of gelling of a positive electrode mixture material paste, although it considers output characteristics. As seen above, some of the above proposals consider suppression of gelling of a positive electrode mixture material paste, but does not seem to have sufficiently solved this problem.

In view of the above problems, an object of the present invention is to provide a positive electrode active material for nonaqueous electrolyte secondary batteries and production method thereof that are able to achieve suppression of gelling of a positive electrode mixture material paste, maintenance of the battery capacity when used in a secondary battery, and improvements in output characteristics and charge/discharge cycle characteristics at a high level. Another object of the present invention is to provide a positive electrode mixture material paste and nonaqueous electrolyte secondary battery that use the above positive electrode active material.

Solution to Problem

A first aspect of the present invention provides a method for producing a positive electrode active material for non-aqueous electrolyte secondary batteries. The method includes mixing a fired powder formed of a lithium-metal composite oxide having a layered crystal structure, a first compound which is at least one selected from a group consisting of a lithium-free oxide, a hydrate of the oxide, and a lithium-free inorganic acid salt, and water and drying a mixture resulting from the mixing. The fired powder includes secondary particles represented by a general formula (1) $Li_sNi_{1-x-y-z}Co_xMn_yM_zO_{2+\alpha}$ where $0.055 \le x \le 0.35$; $0 \le y \le 0.35$; $0 \le z \le 0.10$; $1.00 < s < 1.30$; $0 \le \alpha \le 0.2$; and M is at least one element selected from V, Mg, Mo, Nb, Ti, W, and Al and formed by agglomeration of primary particles. The first compound is a compound that reacts with lithium ions in the presence of water so that a second compound including lithium can be formed. A content of the first compound in the mixture is an amount such that pH at 25° C. of a supernatant fluid obtained by dispersing 5 g of a positive electrode active material resulting from the drying in 100 ml of pure water and leaving a resulting solution to stand for 10 min is measured as 11 or more and 11.9 or less.

Preferably, the lithium-free oxide preferably includes at least one selected from a group consisting of tungsten oxide, molybdenum oxide, vanadium pentoxide, niobium oxide, tin dioxide, manganese oxide, ruthenium oxide, rhenium oxide, tantalum oxide, phosphorus oxide, and boron oxide. Preferably, the first compound includes at least one selected from tungsten oxide and tungstic acid. Preferably, the first compound is mixed into the fired powder and then the water is mixed. Preferably, an average particle size of the fired powder is in a range of 3 μm or more and 15 μm or less, and [(d90−d10)/average particle size] of the fired powder which is an index indicating a width of a particle size distribution is 0.7 or less. Preferably, a percentage of an area occupied by pores measured by a cross-sectional observation of the fired powder is 4.5% or more and 60% or less with respect to an entire cross-sectional area of the fired powder. Preferably, the amount of elements included in the first compound in the mixture and capable of reacting with lithium ions is 0.03 percent by mol or more and 1.2 percent by mol or less with respect to a sum of Ni, Co, Mn, and M in the fired powder. Preferably, a content of the water in the mixture is 0.5 percent by mass or more with respect to the fired powder. Preferably, the drying is performed at 100° C. or more and 300° C. or less.

A second aspect of the present invention provides a positive electrode active material for nonaqueous electrolyte secondary batteries, the positive electrode active material being formed of a lithium-metal composite oxide powder having a layered crystal structure. The lithium-metal composite oxide powder includes secondary particles represented by a general formula (2) $Li_sNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles and a second compound including lithium. The second compound is a compound that is present on a surface of the primary particles and that is formed by reaction of a first compound with lithium ions in the presence of water, the first compound being at least one selected from a group consisting of a lithium-free oxide, a hydrate of the oxide, and a lithium-free inorganic acid salt. pH at 25° C. of a supernatant fluid obtained by dispersing 5 g of the positive electrode active material in 100 ml of pure water and leaving a resulting solution to stand for 10 min is measured as 11 or more and 11.9 or less.

Preferably, an average particle size is in a range of 3 μm or more and 15 μm or less, and [(d90−d10)/average particle size] which is an index indicating a width of a particle size distribution is 0.7 or less. Preferably, a percentage of an area occupied by pores measured by a cross-sectional observation of the lithium-metal composite oxide powder is 4.5% or more and 60% or less with respect to entire cross-sectional areas of all the composite oxide powder particles. Preferably, the amount of elements other than lithium and oxygen included in the second compound is 0.03 percent by mol or more and 1.2 percent by mol or less with respect to a sum of Ni, Co, Mn, and M in the lithium-metal composite oxide powder. Preferably, the ratio of d90 to d50 (d90/d50) obtained from a volume integrated value in a particle size distribution measured using laser diffraction/scattering is less than 1.35.

A third aspect of the present invention provides a positive electrode mixture material paste for nonaqueous electrolyte secondary batteries, the positive electrode mixture material paste including any one of the above positive electrode active materials for nonaqueous electrolyte secondary batteries.

A fourth aspect of the present invention provides a nonaqueous electrolyte secondary battery including a positive electrode including any one of the above positive electrode active materials for nonaqueous electrolyte secondary batteries.

Advantageous Effects of the Invention

According to the present invention, there can be provided a positive electrode active material for nonaqueous electrolyte secondary batteries and production method thereof that are able to achieve suppression of gelling of a positive electrode mixture material paste, maintenance of the battery capacity of a secondary battery, and improvements in output characteristics and charge/discharge cycle characteristics of a secondary battery at a high level. Also, this production method is easy and suitable for industrial-scale production and therefore the industrial value thereof is extremely high.

DESCRIPTION OF EMBODIMENTS

Figure 1:
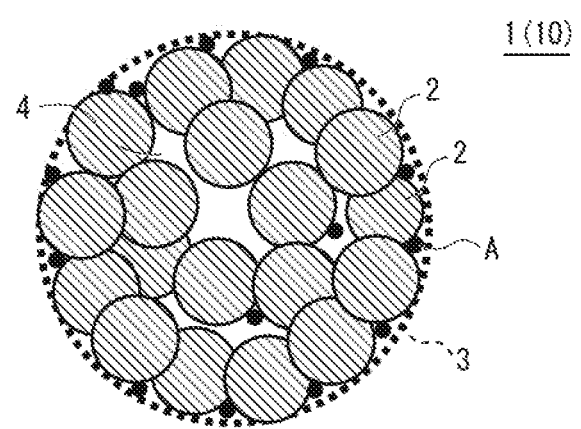
FIG. 1 is a drawing showing an example of a positive electrode active material for nonaqueous electrolyte secondary batteries of an embodiment.

Now, a positive electrode active material for nonaqueous electrolyte secondary batteries and production method thereof, a positive electrode mixture material paste for nonaqueous electrolyte secondary batteries, and a nonaqueous electrolyte secondary battery of the present embodiment will be described with reference to the drawings. To clarify the elements, the elements are partially highlighted or simplified in the drawings and therefore the structures, shapes, scales, or the like thereof may differ from actual ones.

1. Positive Electrode Active Material

FIG. 1 is a schematic drawing showing a positive electrode active material 10 for nonaqueous electrolyte secondary batteries (also simply referred to as "positive electrode active material 10") of the present embodiment. The positive electrode active material 10 is formed of a lithium-metal composite oxide powder 1 (also referred to as "composite oxide powder 1") having a layered crystal structure. The composite oxide powder 1 includes secondary particles 3 represented by a general formula (2) $Li_sNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles 2, and a second compound A containing lithium.

The second compound A is present on the primary particles 2 and is a compound formed by reaction of at least one first compound (also referred to as "oxide or the like") selected from a group consisting of a lithium-free oxide, a hydrate of the oxide, and a lithium-free inorganic acid salt with lithium ions in the presence of water. The first compound (oxide, etc.) is, for example, a component that is able to form oxoanions, which react with lithium ions, in the presence of water. The second compound A is, for example, a lithium salt of oxoanions. Hereafter, the second compound A is also referred to as "lithium salt."

A conventional known composite oxide powder can be obtained, for example, by firing a nickel composite hydroxide or nickel composite oxide and a lithium compound. In the case of a composite oxide powder obtained using a conventional known production method, an unreacted lithium compound is present on the surface of the secondary particles or primary particles. Such an unreacted lithium compound, in particular, lithium hydroxide may be eluted into a positive electrode mixture material paste (also referred to as "paste"), increasing pH and thus gelling the paste. Also, when a paste is prepared, excess lithium present in the composite oxide particles in addition to an unreacted lithium compound may be eluted into the paste, causing gelling of the paste as lithium hydroxide.

The present inventors noted the first compound (oxide, etc.) that is able to form a compound by reacting with lithium hydroxide and completed the present invention on the basis of a new idea that elution of lithium into a paste and thus gelling of the paste are suppressed by causing the first compound (oxide, etc.), and an unreacted lithium compound and excess lithium in composite oxide particles ("the unreacted lithium compound" and "the excess lithium in the composite oxide particles" are also collectively referred to as "surplus lithium") to react with each other and fixing the resulting compound on the surface of the primary particles as a second compound A (lithium salt).

For example, the positive electrode active material 10 of the present embodiment forms a second compound A (lithium salt) on the surface of the primary particles 2 by causing excess lithium in the composite oxide powder (raw-material) serving as a base material to react with a specific amount of first compound (oxide, etc.). Thus, elution of lithium into a paste and thus gelling of the paste are suppressed. As will be discussed later, the presence of the second compound A on the surface of the primary particles 2 allows for not only suppression of gelling of the paste but also further improvements in characteristics and cycle characteristics.

According to investigation of the present inventors, for example, even if acidic oxide is directly added to a positive electrode active material without mixing it with water, at least part of surplus lithium eluted into a paste and the acidic oxide react with each other (are neutralized). Thus, an increase in pH can be suppressed, thereby suppressing gelling of the paste to some degree. However, sufficient effects are not obtained (see Comparative Example 6). On the other hand, if the second compound A is fixed on the surface of the primary particles 2 by causing surplus lithium in the composite oxide powder (raw-material) to react with the first compound (oxide, etc.) in the presence of water in advance, as seen in the positive electrode active material 10 of the present embodiment, gelling of the paste can be further suppressed. Also, output characteristics and cycle characteristics can be further improved while maintaining the charge/discharge capacity.

As used herein, the term "the surface of the primary particles 2" includes the surface of the primary particles 2 exposed on the outer surface of the secondary particles 3 and the surface of the primary particles 2 exposed to internal pores 4 that are present near the surface of and inside the secondary particles 3 and that communicate with the outside of the secondary particles 3 and are permeable by an electrolyte solution. The surface of the primary particles 2 also includes the electrolyte solution-permeable boundaries between incompletely bonded primary particles 2. That is, since elution of the unreacted lithium compound and excess lithium into the paste occurs on the contact surface between the primary particles 2 and the electrolyte solution, such elution can be suppressed by forming a second compound A (lithium salt) on the surface of the primary particles 2, which is the surface in contact with the electrolyte solution. Note that the composite oxide powder 1 may include independent primary particles in addition to the secondary particles 3.

The second compound A may be formed on some parts of the surface of multiple primary particles 2 forming each secondary particle 3, or may be formed on the entire surface of the multiple primary particles 2. For example, even if an unreacted lithium compound present on the contact surface between the primary particles 2 and the electrolyte solution reacts with the first compound (oxide, etc.) or excess lithium in the lithium-metal composite oxide particles is drawn out and then reacts with the first compound (oxide, etc.) and thus a second compound A (lithium salt) is formed on some parts of the surface of the primary particles 2, gelling suppression effects can be obtained. The second compound A may be present in the form of particles on the surface of the primary particles 2 as shown in FIG. 1, or may be present in the form of a layer on the surface of the primary particles 2.

The positive electrode active material 10 is a positive electrode active material such that the pH at 25° C. of a supernatant fluid obtained by dispersing 5 g of the positive electrode active material in 100 ml of pure water and leaving the solution to stand for 10 min (also simply referred to as "the pH value of the positive electrode active material") is measured as 11 or more and 11.9 or less. By measuring the pH of a supernatant fluid obtained by dispersing 5 g of the positive electrode active material in 100 ml of pure water and leaving the solution to stand for 10 min, there can be evaluated the degree of elution of surplus lithium into a paste prepared using the positive electrode active material 10.

As described above, surplus lithium in the positive electrode active material may be eluted into a paste, increasing pH. As will be described in Examples later, the present inventors found that gelling of the paste is significantly influenced by the pH of the positive electrode active material and that suppression of gelling of the paste and an improvement in battery characteristics can be achieved by forming a lithium salt (second compound) on the surface of the primary particles and controlling the pH of the positive electrode active material within a particular range, and then completed the present invention. In the case of the positive electrode active material 10 of the present invention, the pH thereof is controlled within the above range by forming a second compound A including lithium on the surface of the primary particles 2. Some literatures, including Patent Literature 5, have reported positive electrode active materials having lithium-containing particles on the surface of primary particles. However, any of those literatures has not conceived of controlling the pH of the positive electrode active material within a particular range by forming a second compound A unlike in the case of the positive electrode active material 10.

By controlling the pH at 25° C. of the supernatant fluid so as to be 11 or more and 11.9 or less, the positive electrode active material 10 is able to suppress gelling of a paste and to have high output characteristics and excellent cycle characteristics while maintaining the charge/discharge capacity. On the other hand, if the pH of the positive electrode active material is less than 11, an excessive amount of second compound A (lithium salt) may be formed, and a greater amount of lithium than necessary may be drawn out from the metal composite oxide particles. If such a positive electrode active material is used as the positive electrode of a battery, the charge/discharge capacity may decrease, or the reaction resistance of the positive electrode may increase. Also, if the pH of the positive electrode active material is more than 11.9, a great amount of lithium would be eluted when preparing a paste, making it difficult to suppress gelling of the paste.

The second compound A present on the surface of the primary particles 2 is able to suppress gelling of the paste, as well as to improve output characteristics. Also, the second compound A has lithium-ion conductivity and an effect of promoting the migration of lithium ions. For this reason, by forming a second compound A on the surface of the primary particles 2 of the metal composite oxide, Li conduction paths can be formed on the interface with the second compound A and an electrolyte solution in a secondary battery, reducing the reaction resistance of the positive electrode active material (may be referred to as "positive electrode resistance"). A reduction in the reaction resistance will reduce the voltage lost in the battery and relatively increase the voltage actually applied to the load, producing high output. Also, an increase in the voltage applied to the load in the secondary battery allows a sufficient amount of lithium to be stored in and released from the positive electrode. Thus, the charge/discharge capacity of the battery (may be referred to as "battery capacity") can be maintained or improved, and cycle characteristics can also be improved.

The second compound A is a lithium salt. Examples of a lithium salt include lithium tungstate, lithium molybdate, lithium vanadate, lithium niobate, lithium stannate, lithium manganate, lithium ruthenate, lithium rhenate, lithium tantalate, lithium phosphate, and lithium borate. The second compound A may be a single compound or may be two or more compounds. Preferably, the second compound A includes at least one selected from a group consisting of lithium tungstate, lithium molybdate, lithium vanadate, and lithium niobite among these lithium salts. More preferably, the second compound A includes at least one selected from lithium tungstate and lithium molybdate.

Examples of lithium tungstate include $Li_2WO_4$, $Li_4WO_5$, $Li_6W_2O_9$, and mixtures thereof. Preferably, at least part of lithium tungstate is present in the form of $Li_4WO_5$ among these forms. More preferably, 65% or more of W is present in the form of $Li_4WO_5$ or $Li_2WO_4$. Among the forms of lithium tungstate, $Li_4WO_5$ includes many Li ion conduction paths and has a high Li ion migration promotion effect. For this reason, if W is present in the form of $Li_4WO_5$ on the surface of the primary particles, a higher reaction resistance reduction effect can be obtained.

The first compound (oxide, etc.) is one or more selected from a group consisting of a lithium-free oxide, a hydrate of the oxide, and a lithium-free inorganic acid salt. The first compound (oxide, etc.) is a lithium-free compound and can act as the raw-material of a second compound A. The first compound (oxide, etc.) may be any type of compound as long as it is a compound that reacts with lithium ions in the presence of water so that a second compound A (lithium salt) can be formed. For example, the first compound (oxide, etc.) is preferably an acid oxide, more preferably a solid acid oxide.

The lithium-free oxide includes, for example, at least one oxide selected from a group consisting of tungsten oxide, molybdenum oxide, vanadium pentoxide, niobium oxide, tin dioxide, manganese oxide, ruthenium oxide, rhenium oxide, tantalum oxide, phosphorus oxide, and boron oxide. The lithium-free oxide preferably includes at least one selected from a group consisting of tungsten oxide, molybdenum oxide, and vanadium pentoxide among these. A second compound A (lithium salt) formed by the reaction between such an oxide and lithium ions has high lithium ion conductivity and a higher lithium ion migration promotion effect and therefore is able to suppress gelling of a paste and to further improve the output characteristics and battery capacity of a secondary battery.

Examples of the hydrate of the oxide include a tungstic acid, a molybdic acid, a vanadic acid, and a niobic acid.

Preferably, the inorganic acid salt is, for example, a compound of an inorganic acid including the hydrate of the oxide and a base. Examples of such a compound include ammonium tungstate, ammonium molybdate, ammonium vanadate, and ammonium niobite.

As described above, not only the second compound A but also surplus lithium including an unreacted lithium compound (e.g., lithium hydroxide) is present on the surface of the primary particles 2. The content of the surplus lithium is preferably 0.05 percent by mass or less, more preferably 0.03 percent by mass or less with respect to the total amount of the positive electrode active material 10. The content of the surplus lithium can be obtained by titrating the amount of lithium eluted into the supernatant fluid when slurring the positive electrode active material 10, using inorganic acid. Since excess lithium present in the lithium-metal composite oxide particles (in crystals) is also eluted into the slurry, the surplus lithium includes the excess lithium. If the content of the surplus lithium is set to 0.05 percent by mass or less, the amount of lithium eluted into the paste can be further reduced, resulting in further suppression of gelling of the paste. Also, high output characteristics and excellent cycle characteristics can be obtained while maintaining high charge/discharge capacity.

The surplus lithium has poor lithium conductivity and may hamper the migration of lithium ions from the lithium-metal composite oxide. For this reason, by reducing the surplus lithium, the lithium ion migration promotion effect of the lithium salt is increased, and the load on the lithium-metal composite oxide during charge/discharge is reduced. Thus, cycle characteristics can be improved. Also, by controlling the amount of surplus lithium, the migration of lithium ions between the lithium-metal composite oxide particles is made uniform, and application of a load to particular metal composite oxide particles is suppressed. Thus, cycle characteristics can be improved.

To suppress a reduction in battery characteristics, the lower limit of the content of surplus lithium is preferably 0.01 percent by mass or more with respect to the total amount of the positive electrode active material. An excessively small amount of surplus lithium means that an excessively large amount of lithium has been drawn out from the crystals of the composite oxide when a second compound (lithium salt) is formed.

The composite oxide powder 1 includes the secondary particles 3 represented by the general formula (2) $Li_sNi_{1-x-y-z}Co_xMn_yMO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al. The composite oxide powder 10 including the secondary particles 3 having the above general formula can have high output characteristics and battery capacity. Also, as described above, the positive electrode active material 10 having the second compound A formed on the surface of the primary particles 2 thereof suppresses gelling of a paste and exhibits excellent output characteristics and battery capacity when used in a secondary battery. In the above formula (2), α is a coefficient that varies with the valence of metal elements other than lithium included in the lithium-metal composite oxide powder 1 and the ratio of the atomic number of lithium to that of the metal elements other than lithium.

The amount of an element other than lithium and oxygen included in the second compound A (may be referred to as "lithium salt formation element") is preferably 0.03 percent by mol or more and 1.2 percent by mol or less with respect to the sum of Ni, Co, Mn, and M in the composite oxide. Note that the amount of lithium salt formation element represents the amount of an element that is bound with oxygen to form an oxide or inorganic acid in the first compound (oxide, etc.).

This amount can be controlled within the above range by adjusting the amount of first compound to be mixed.

The entire positive electrode active material is preferably represented by a general formula (3) below. As used herein, the term "entire positive electrode active material" refers to the entire lithium-metal composite oxide powder 1 including the secondary particles represented by the general formula (2) and the second compound A.

General Formula (3) $LiNi_{1-x-y-z}Co_xMn_yM_zA_tO_{2+\alpha}$ (in the formula (2), $0.055 \le x \le 0.35$; $0 \le y \le 0.35$; $0 \le z \le 0.10$; $1.00 < s < 1.30$, $0.00015 \le t \le 0.03$; $0 \le \alpha \le 0.2$; M is at least one element selected from V, Mg, Mo, Nb, Ti, W, and Al; and A represents an element other than lithium and oxygen included in the second compound.

In the general formula (3), t represents the amount of lithium salt formation element (A) included in the second compound A (lithium salt). In the formula (3), t is $0.00015 \le t \le 0.03$, preferably $0.00035 \le t \le 0.02$, more preferably $0.00035 \le t \le 0.012$. If t is within the above range, gelling of a paste can be further suppressed, and the positive electrode resistance can be reduced. Also, output characteristics and cycle characteristics can be improved. On the other hand, if t is less than 0.0001, a sufficient amount of second compound (lithium salt) would not be formed, failing to obtain sufficient gelling suppression and positive electrode resistance reduction effects. Also, if t is more than 0.03, an excessive amount of second compound (lithium salt) may be formed, hampering the lithium conduction of the lithium-metal composite oxide and electrolyte solution and thus reducing the battery capacity. In the above formula (3), a represents a coefficient that varies with the valence of metal elements other than lithium included in the lithium-metal composite oxide powder 1, the content and valence of A, and the ratio of atomic number of lithium to that of the metal elements other than lithium.

The lithium salt formation element (A) preferably includes at least one selected from a group consisting of tungsten (W), molybdenum (Mo), vanadium (V), niobium (Nb), tin (Sn), manganese (Mn), ruthenium (Ru), rhenium (Re), tantalum (Ta), phosphorus (P), and boron (B).

The second compound A (lithium salt) is present on the surface of the primary particles 2 included in the composite oxide powder 1 and thus the pH value of the positive electrode active material 10 is controlled. The composition of Ni, Co, Mn, and M in the positive electrode active material 10 may be the composition of a known lithium-metal composite oxide, and an appropriate composition may be selected in accordance with the required characteristics of a battery. In the formula (2) or formula (3), M may be selected from the above multiple elements (at least one selected from V, Mg, Mo, Nb, Ti, W, and Al) in accordance with the required characteristics. For example, aside from the lithium salt formation element (A), at least one element selected from V, Mo, Nb, and W may be added to the composite oxide. In particular, addition of W is effective in improving the battery capacity or output characteristics of the lithium-metal composite oxide itself.

The powder characteristics and particle structure of the positive electrode active material 10 (composite oxide powder 1) may be selected from those of known lithium-metal composite oxides in accordance with the required characteristics of a secondary battery. As will be discussed later, the positive electrode active material 10 inherits the powder characteristics or the like from the fired powder used as a raw-material except that the fired powder does not include the second compound A. Accordingly, by selecting a fired powder (raw-material) having desired powder characteristics or the like, a positive electrode active material 10 having predetermined powder characteristics or the like can be obtained.

For example, the average particle size of the positive electrode active material 10 is preferably in a range of 3 µm or more and 15 µm or less, and [(d90-d10)/average particle size] thereof, which is an index indicating the width of the particle size distribution is preferably 0.7 or less. Thus, the filling ability can be increased, resulting in a further increase in the per-unit volume battery capacity of a secondary battery. Also, the voltages applied to the composite oxide particles can be made uniform, making the loads on the particles uniform and thus further increasing the cycle characteristics.

In the index [(d90-d10)/average particle size] indicating the width of the particle size distribution, d10 represents a particle size when the number of particles having each particle size is cumulatively summed up from the number of particles having the smallest particle size and then the cumulative volume reaches 10% of the total volume of all particles. d90 represents a particle size when the number of particles is cumulatively summed up in a similar manner and then the cumulative volume reaches 90% of the total volume of all particles. The average particle size, d90, and d10 can be obtained from a volume integrated value measured using a laser diffraction/scattering particle size analyzer. Preferably, the average particle size is d50, which a particle size when the cumulative volume reaches 50% of the total volume of all particles, as with d10 and d90.

With respect to the positive electrode active material 10, the ratio of d90 to d50 (d90/d50), obtained from the volume integrated value in the particle size distribution measured using laser diffraction/scattering, is preferably less than 1.35. If the ratio of d90 to d50 is more than 1.35, the proportion of coarse particles formed by agglomeration of composite oxide particles tends to be increased, reducing battery characteristics.

The percentage of the area occupied by pores (also referred to as "porosity") measured by a cross-sectional observation of the positive electrode active material 10 is preferably 4.5% or more and 60% or less of entire cross-sectional areas of the secondary particles 3. If the porosity is within the above range, a higher positive electrode resistance reduction effect can be obtained while suppressing gelling of the paste. On the other hand, if the porosity is less than 4.5% of the entire cross-sectional areas, a higher positive electrode resistance reduction effect may not be obtained. Also, if the porosity is more than 60%, the filling ability may be reduced, failing to obtain a sufficient per-unit volume battery capacity of a battery. As used herein, the term "entire cross-sectional areas of the secondary particles 3" refers to cross-sectional areas including those of the pores 4 in the secondary particles 3.

The porosity can be measured by observing any cross-sections of secondary particles using a scanning electron microscope and then analyzing an image thereof. Specifically, the porosity is calculated as c: multiple composite oxides (secondary particles) are embedded in a resin or the like; a cross-section sample is generated using a cross-section polisher or the like so that cross-sections of secondary particles can be observed using a scanning electron microscope; then, pores in arbitrarily (randomly) selected 20 or more secondary particles are detected as black portions using image analysis software (e.g., WinRoof 6.1.1); dense portions in the outlines of the secondary particles are detected as white portion; the total area of the black portions and the white portions in the 20 or more secondary particles is measured; and the area ratio [black portions/(black portions+white portions)] is calculated.

The specific surface area of the positive electrode active material 10 is preferably 1 $m^2/g$ or more and 50 $m^2/g$ or less. If the specific surface area is less than 1 $m^2/g$, the positive electrode active material 10 may contact an electrolyte solution in a small area, failing to obtain high output characteristics. Also, if the specific surface area is more than 50 $m^2/g$, the positive electrode active material 10 may contact the electrolyte solution in too large an area, failing to sufficiently suppress gelling. The specific surface area can be obtained using the BET method, which uses nitrogen gas adsorption.

2. Method for Producing Positive Electrode Active Material for Nonaqueous Electrolyte Secondary Batteries A method for producing a positive electrode active material for nonaqueous electrolyte secondary batteries of the present embodiment (also referred to as "positive electrode active material production method") includes mixing a fired powder formed of a lithium-metal composite oxide having a layered crystal structure, at least one first compound selected from a group consisting of a lithium-free oxide, a hydrate of the oxide, and a lithium-free inorganic acid salt, and water (step S01) and drying the mixture resulting from the mixing (step S02). This positive electrode active material production method allows the positive electrode active material 10 as described above to be easily obtained with high productivity. The above steps will be described below with reference to FIGS. 2 and 3.

Figure 2:
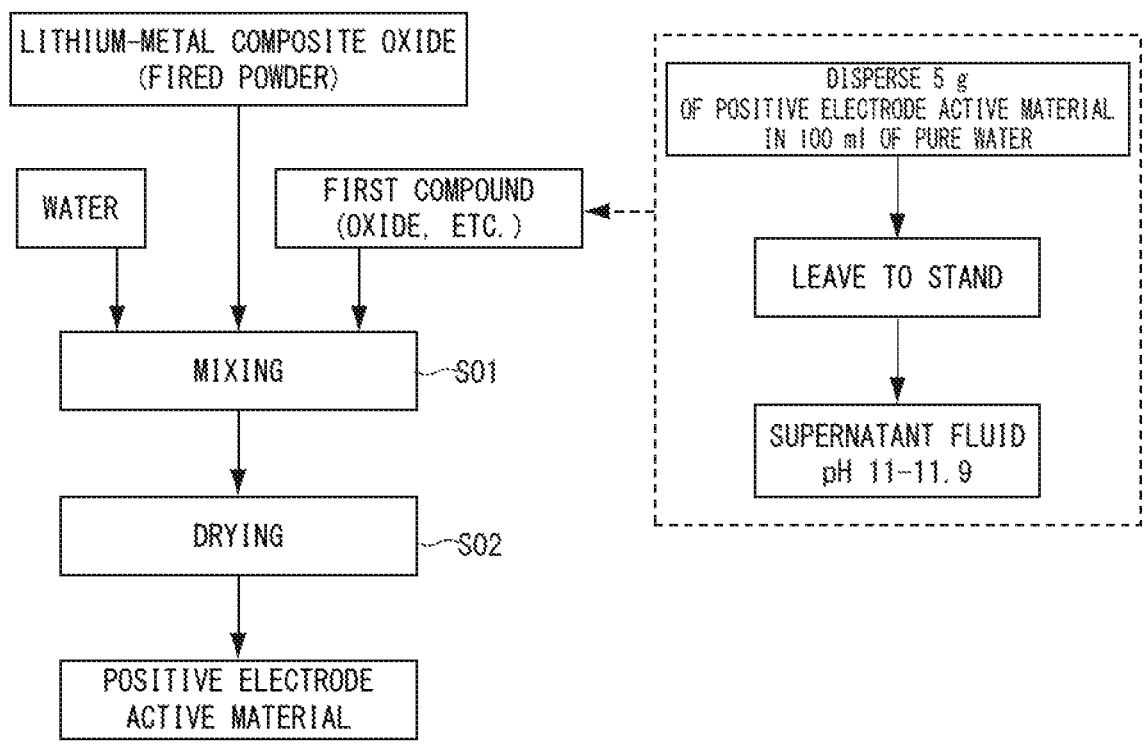
FIG. 2 is a diagram showing an example of a method for producing a positive electrode active material for nonaqueous electrolyte secondary batteries of the embodiment.
Figure 3:
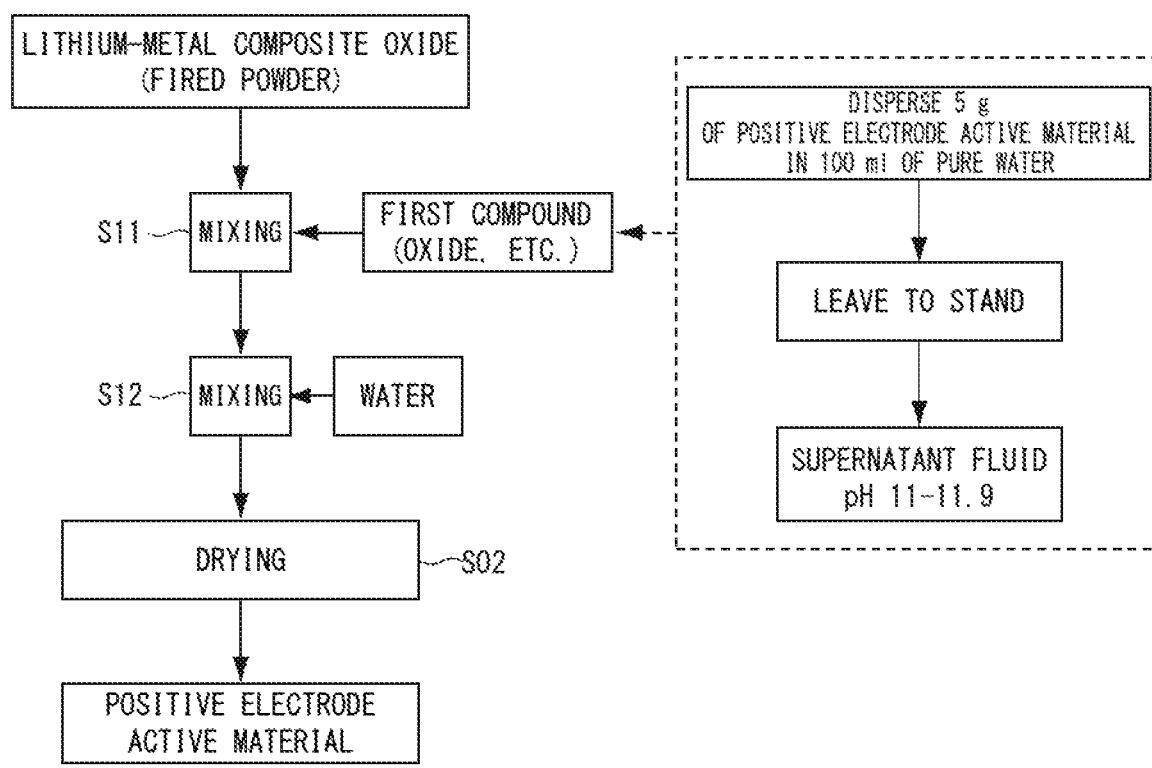
FIG. 3 is a diagram showing an example of a method for producing a positive electrode active material for nonaqueous electrolyte secondary batteries of the embodiment.

FIG. 2 is a diagram showing an example of the positive electrode active material production method of the present embodiment. However, the positive electrode active material production method described below is illustrative only, and other methods may be used. In the description with reference to FIG. 2, FIG. 3 is referred to as necessary.

As shown in FIG. 2, in the positive electrode active material production method, first, a fired powder formed of a lithium-metal composite oxide having a layered crystal structure, a first compound (oxide, etc.), and water are mixed (step S01). At this time, the first compound (oxide, etc.) is mixed such that the pH at 25° C. of a supernatant fluid obtained by dispersing 5 g of an obtained positive electrode active material in 100 ml of pure water and leaving the solution to stand for 10 min (also referred to as "the pH value of the positive electrode active material") is measured as 11 or more and 11.9 or less.

The first compound (oxide, etc.) may be any type of compound as long as it does not include lithium and reacts with lithium ions derived from surplus lithium (lithium hydroxide, etc.) in the presence of water so that a second compound can be formed. The first compound is, for example, a tungsten compound. Examples of a tungsten compound include tungsten oxide, tungstic acid, and ammonium tungstate. Among these tungsten compounds, at least one of tungsten oxide and tungstic acid is preferably used, and tungsten oxide, which is less likely to produce water when reacting with lithium, is more preferably used. Hereafter, tungsten oxide and tungstic acid are also collectively referred to as "tungsten oxide and the like."

Also, the first compound (oxide, etc.) is, for example, a molybdenum compound. Examples of a molybdenum compound include molybdenum oxide, molybdic acid, and ammonium molybdate. At least one of molybdenum oxide and molybdic acid is preferred, and molybdenum oxide is more preferred. Note that a single first compound (oxide, etc.) may be used, or two or more first compounds may be used in a mixed manner.

In the mixing step (step S01), the first compound (oxide, etc.) is mixed in an amount such that the pH value of a positive electrode active material resulting from the drying is 11 or more and 11.9 or less. More specifically, the content of the first compound (oxide, etc.) in the mixture is an amount such the pH at 25° C. of a supernatant fluid obtained by dispersing 5 g of a positive electrode active material resulting from the drying in 100 ml of pure water and leaving the resulting solution to stand for 10 min is measured as 11 or more and 11.9 or less.

Over the water-present mixing step (step S01) and the subsequent drying step (step S2), the first compound (oxide, etc.) reacts with an unreacted lithium compound or excess lithium in the composite oxide particles (also collectively referred to as "surplus lithium") to form a second compound A (lithium salt). As described above, the formation of the second compound A allows for production of a positive electrode active material that suppresses elution of lithium into a paste and has high output characteristics and excellent cycle characteristics while maintaining high battery capacity.

The amount of first compound (oxide, etc.) to be added can be easily determined by conducting a preliminary test using a small amount of fired powder and identifying an amount such that the pH of a positive electrode active material is within the above range. In a system where Li/Me or the conditions for producing the fired powder is stable, the pH value of a positive electrode active material can be controlled within the above range even in a subsequent production process by using the added amount of first compound determined in the preliminary test.

The amount of surplus lithium present in the fired powder of the lithium-metal composite oxide varies with the atomic ratio of Li to the sum of Ni, Co, Mn, and M in the fired powder (Li/Me) or the conditions for producing the fired powder. For this reason, the first compound (oxide, etc.), which forms a lithium salt with surplus lithium, is added in an amount such that the pH value of a positive electrode active material can be controlled with the above range. More specifically, the first compound (oxide, etc.) is added in an amount such that the pH at 25° C. of a supernatant fluid obtained by dispersing 5 g of a positive electrode active material resulting from the drying in 100 ml of pure water and leaving the resulting solution to stand for 10 min is measured as 11 or more and 11.9 or less.

As described above, the content of the first compound in the mixture is an amount such that the pH value of a positive electrode active material can be controlled within the above range. Further, the amount of elements included in the first compound and capable of reacting with lithium ions with respect to the sum of Ni, Co, Mn, and M in the fired powder is preferably 0.01 percent by mol or more and 3 percent by mol or less, more preferably 0.02 percent by mol or more and 2 percent by mol or less, even more preferably 0.03 percent by mol or more and 1.2 percent by mol or less. Note that the amount of elements included in the first compound in the mixture and capable reacting with lithium ions can be said to be the same as the amount of lithium salt formation element (A). This is because the amount of elements is inherited by a positive electrode active material and most of the first compound reacts with surplus lithium to form a second compound A (lithium salt). If the amount of elements capable of reacting with lithium ions is within the above range, an appropriate amount of second compound (lithium salt) is formed. Thus, the pH value of the positive electrode active material can be controlled, and the battery capacity or output characteristics can be further improved.

The amount of water mixed in the mixing step (step S1) may be adjusted properly in accordance with the powder characteristics or particle structure of the fired powder. Preferably, the amount of water is an amount such that surplus lithium in the fired powder and the first compound (oxide, etc.) can be dissolved so as to sufficiently react with each other. For example, the amount of water with respect to the amount of fired powder is preferably 0.5 percent by mass or more and 40 percent by mass or less, more preferably 0.5 percent by mass or more and 35 percent by mass or less, even more preferably 0.5 percent by mass or more 34 and percent by mass or less, particularly preferably 1 percent by mass or more and 30 percent by mass or less. Thus, the reaction between the first compound (oxide, etc.) and surplus lithium is facilitated, and a second compound (lithium salt) is formed such that elution of lithium can be further reduced.

Lithium in the fired powder is eluted into the mixed water, and the first compound (oxide, etc.) is also dissolved in the mixed water. For this reason, if a sufficient amount of water is mixed, the first compound can be caused to sufficiently permeate the composite oxide particles to the extent that it permeates the surface of the primary particles in the composite oxide particles, as well as can be uniformly distributed to the lithium-metal composite oxide particles. Thus, output characteristics or cycle characteristics can be further improved. If a fired powder formed of a composite oxide having a porosity of 10% or more is used, the amount of water in the mixture with respect to the fired powder may be, for example, 10 percent by mass or more and 35 percent by mass or less.

In the mixing step (step S01), the first compound (oxide, etc.) and water may be added to the fired powder simultaneously. Or, as shown in FIG. 3, the first compound (oxide, etc.) may be added and mixed (step S11) and then water may be added and mixed (step S12). If the fired powder and the first mixture (oxide, etc.) are mixed first, the uniformity of the mixed state in the fired powder can be further increased. If the amount of first mixture (oxide, etc.) to be added is small, it is particularly preferred to first mix the fired powder and the first mixture (oxide, etc.).

The fired powder includes secondary particles represented by a general formula (1): $LiNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles. Since the powder characteristics or particle structure of the fired powder are inherited by a positive electrode active material resulting from the drying, the composition, powder characteristics, particle structure, or the like of the fired powder can be regarded as similar to that of the above positive electrode active material 10 except that the fired powder does not include a lithium salt. The fired powder can be selected in accordance with a positive electrode active material to be obtained. In the above formula (1), a represents a coefficient that varies with the valence of metal elements other than lithium included in the lithium-metal composite oxide and the ratio of atomic number of lithium to that of the metal elements other than lithium.

As with the above positive electrode active material, the average particle size of the fired powder is 3 μm or more and 15 μm or less, and [(d90-d10)/average particle size] thereof, which is an index indicating the width of the particle size distribution, is 0.7 or less. The percentage of the area occupied by pores measured by a cross-sectional observation of the fired powder is preferably 4.5% or more and 60% of cross-sectional areas of the lithium-metal composite oxide particles.

Then, the mixture resulting from the mixing is dried (step S02). This step involves drying the mixture obtained by mixing the first compound (oxide, etc.), water, and the fired powder and forming a second compound (lithium salt) on the surface of the primary particles by causing surplus lithium dissolved in water in the mixture and the first compound (oxide, etc.) to react with each other. Thus, the above positive electrode active material 10 can be obtained.

The drying temperature is preferably 450° C. or less. If the drying temperature is more than 450° C., a greater amount of lithium may be liberated from the crystals of the lithium-metal composite oxide, failing to sufficiently suppress gelling of a paste. To dry the mixture more sufficiently and prevent liberation of lithium from the lithium-metal composite oxide, the drying temperature is more preferably 100° C. or more and 300° C. or less.

To avoid the reaction between water or carbonic acid in the atmosphere and an unreacted lithium compound remaining on the surface of the composite oxide particles, the atmosphere during drying is preferably decarboxylation air, inert gas, or vacuum atmosphere. The pressure of the atmosphere during drying is preferably a pressure of one atmosphere or less. If the atmosphere pressure is a pressure of more than one atmosphere, the water content of the positive electrode active material may not be reduced sufficiently. The drying time may be any length of time as long as water can be eliminated to the extent that liberation of lithium from the lithium-metal composite oxide can be prevented. For example, the drying time is 1 h or more and 24 h or less, more preferably 2 h or more and 15 h or less.

The water content of the positive electrode active material resulting from the drying may be any percentage, but is preferably 0.2 percent by mass or less, more preferably 0.15 percent by mass or less. If the water content is more than 0.2 percent by mass, the positive electrode active material may absorb a gas component containing carbon or sulfur in the air, producing a lithium compound on the surface. Note that the above water content measurement value is a measurement value measured using a Karl Fischer moisture meter at a vaporization of 300° C.

3. Positive Electrode Mixture Material Paste for Nonaqueous Electrolyte Secondary Batteries A positive electrode mixture material paste of the present embodiment reduces elution of lithium from a positive electrode active material and thus significantly suppresses gelling of itself. Thus, even if the paste is stored for a long period of time, it will keep high stability with less viscosity change. If a positive electrode is produced using this paste, the positive electrode will have stable and excellent characteristics, and a battery, which is a final product, will also have stable and high characteristics. With respect to a change in viscosity of the paste of the present embodiment, for example, the viscosity after 76-hour storage with respect to the viscosity immediately after preparation of a paste prepared under conditions described in Examples (to be discussed later) (paste viscosity after 76-hour storage/paste viscosity immediately after preparation) is preferably closer to 1, for example, preferably 0.6 or more and 1.4 or less, more preferably 0.7 or more and 1.3 or less. If the change in viscosity of the paste is in the above range, a paste whose gelling is significantly suppressed and that has high stability can be obtained.

The positive electrode mixture material paste includes the above positive electrode active material 10. The positive electrode mixture material paste may be formed from any materials and may be formed from materials equivalent to those of a known positive electrode mixture material paste. For example, the positive electrode mixture material paste includes the positive electrode active material 10, a conductive material, and a binder. The positive electrode mixture material paste may further include a solvent. Assuming that the total amount of the solid component of the positive electrode mixture material except for the solvent is 100 parts by mass, the positive electrode mixture material paste preferably has a positive electrode active material content of 60 to 95 parts by mass, a conductive material content of 1 to 20 parts by mass, and a binder content of 1 to 20 parts by mass.

Examples of the conductive material include graphite (natural graphite, artificial graphite, expanded graphite, etc.) and carbon black-based materials, such as acetylene black and Ketjen black.

A binder has a function of binding active material particles together. Examples of a binder include polyvinylidene fluoride (PVDF), polytetrafluoroethylene (PTFE), fluororubber, ethylene propylene diene rubber, styrene butadiene, cellulose-based resin, and polyacrylic acid.

Optionally, a solvent to disperse the positive electrode active material 10, the conductive material, and activated carbon and to dissolve the binder may be added to the positive electrode mixture material. Specifically, the solvent may be an organic solvent such as N-methyl-2-pyrrolidone (NMP). Further, activated carbon may be added to the positive electrode mixture material to increase the electric double layer capacity. The positive electrode mixture material paste can be prepared by mixing the powdery positive electrode active material, the conductive material, and the binder, optionally adding activated carbon and a solvent for viscosity adjustment or other purposes, and kneading these.

4. Nonaqueous Electrolyte Secondary Battery

A nonaqueous electrolyte secondary battery of the present embodiment (also simply referred to as "secondary battery") may include any elements and may include elements similar to those of a known nonaqueous electrolyte secondary battery. For example, the secondary battery includes a positive electrode, a negative electrode, a separator, and a nonaqueous electrolyte solution. The nonaqueous electrolyte secondary battery of the present embodiment below is only illustrative, and various changes or modifications can be made thereto on the basis of the embodiment described in the present specification and, as well as on the basis of the knowledge of those skilled in the art. The nonaqueous electrolyte secondary battery of the present embodiment may be used for any application.

(1) Positive Electrode

The positive electrode of the nonaqueous electrolyte secondary battery is prepared using a positive electrode mixture material paste including the above positive electrode active material, for example, in a manner described below.

The positive electrode mixture material paste is applied to a surface of a collector formed of an aluminum foil and dried to scatter the solvent. Optionally, the applied positive electrode mixture material paste may be pressed using a roll press or the like to increase the electrode density. In this way, a sheet-shaped positive electrode can be produced. The sheet-shaped positive electrode can be used to produce the target battery, for example, by cutting it into a size suitable for the battery. The method for producing a positive electrode described above is illustrative only, and other methods may be used.

(2) Negative Electrode

The negative electrode is formed by mixing a binder with metal lithium, lithium alloy, or the like or a negative electrode active material which can occlude and desorb lithium ions, adding an appropriate solvent to the mixture, applying the resulting pasty negative electrode mixture material onto a metal foil collector formed of copper or the like, drying the mixture material, and optionally compressing it to increase the electrode density.

Examples of the negative electrode active material include natural graphite, artificial graphite, a fired body of an organic compound such as phenol resin, and a powder of a carbon material such as coke. As in the positive electrode, the negative electrode binder may be, for example, a fluorine-containing resin, such as PVDF. The solvent to disperse the active material and the binder may be an organic solvent, such as N-methyl-2-pyrrolidone.

(3) Separator

The separator is disposed so as to be sandwiched between the positive electrode and the negative electrode. The separator separates the positive electrode and the negative electrode and holds the electrolyte. It may be a thin, porous film formed of polyethylene, polypropylene, or the like.

(4) Nonaqueous Electrolyte Solution

The nonaqueous electrolyte solution is prepared by dissolving a lithium salt serving as a supporting electrolyte in an organic solvent. The organic solvent may be one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, and phosphorus compounds such as triethyl phosphate and trioctyl phosphate.

Examples of the supporting electrolyte include $LiPF_6$, $LiBF_4$, $LiClO_4$, $LiAsF_6$, $LiN(CF_3SO_2)_2$, and composite salts thereof. The nonaqueous electrolyte solution may contain a radical scavenger, a surfactant, a flame retardant, or the like.

(5) Shape and Configuration of Battery

The nonaqueous electrolyte secondary battery of the present embodiment including the positive electrode, the negative electrode, the separator, and the nonaqueous electrolyte solution described above can take various shapes, including cylindrical and stacked shapes. Whatever shape it may take, the nonaqueous electrolyte secondary battery is completed by stacking the positive electrode and the negative electrode with the separator therebetween to form an electrode body, impregnating the electrode body with the nonaqueous electrolyte solution, connecting a positive electrode collector and a positive electrode terminal leading to the outside and connecting a negative electrode collector and a negative electrode terminal leading to the outside using collection leads or the like, and hermetically sealing these components in a battery case.

(6) Characteristics

The secondary battery using the positive electrode active material 10 of the present embodiment has high capacity and high output, as well as excellent charge/discharge cycle characteristics. If a secondary battery using a positive electrode active material obtained in a preferred embodiment is used, for example, as the positive electrode of a 2032-type coin battery CBA (see FIG. 5) produced under the conditions described in Examples (to be discussed later), a high initial discharge capacity of 145 mAh/g or more, or 150 mAh/g or more in a preferred embodiment, and low positive electrode resistance are obtained. In the case of this secondary battery, the discharge capacity retention rate measured under the conditions described in Examples (to be discussed later) can become 90% or more.

The initial discharge capacity is a value obtained as follows: the coin secondary battery CBA used in Examples was left alone for about 24 hours; after an open circuit voltage (OCV) was stabilized, the current density with respect to the positive electrode was set to 0.1 mA/cm$^2$; the coin battery CBA was charged to a cut-off voltage of 4.3 V; after being left at rest for one hour, the coin battery CBA was discharged to a cut-off voltage 3.0 V; and the then capacity thereof was measured as the initial discharge capacity. The cycle test (discharge capacity retention rate) was a value obtained as follows: the initial discharge capacity was measured at 60° C.; then the coin battery CBA was left at rested for 10 min; charges and discharges including initial discharge capacity measurements as done in the above initial discharge capacity measurement were repeated in 500 cycles; the discharge capacity in the 500-th cycle was measured; and the percentage of the discharge capacity in the 500-th cycle to the discharge capacity in the 1st cycle (initial discharge capacity) was obtained as the capacity retention rate (%).

Figure 4:
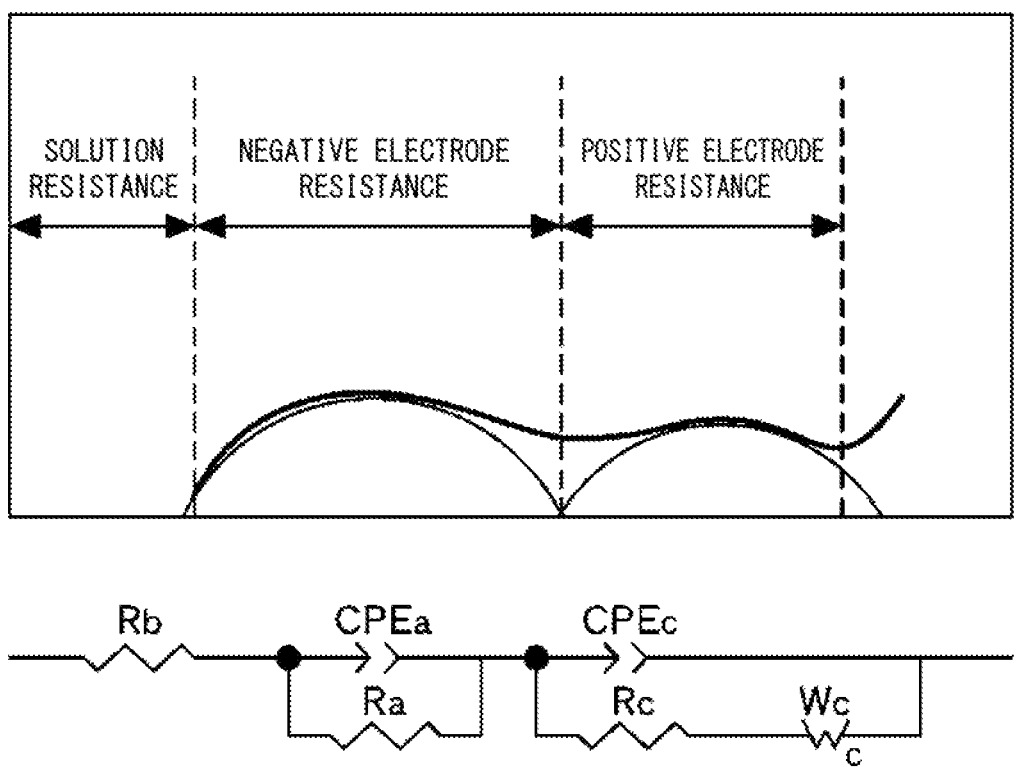
FIG. 4 is a schematic diagram showing an example of an impedance evaluation measurement and an equivalent circuit used for analysis.

In the case of a secondary battery using a positive electrode active material 10 obtained in a preferred embodiment, the positive electrode resistance measured under the conditions described in Examples (to be discussed later), for example, using the coin battery CBA can become 40 or less. An example of a method to measure the positive electrode resistance of the present embodiment is as follows. By measuring the frequency dependence of battery reaction using a typical AC impedance method, which is an electrochemical evaluation technique, there is obtained a Nyquist diagram based on the solution resistance, the negative electrode resistance and negative electrode capacity, and the positive electrode resistance and positive electrode capacity, as shown in FIG. 4. The battery reaction of the electrodes includes resistance components associated with charge migration and capacitance components based on an electrical double layer. By representing these components using an electrical circuit, a parallel circuit of resistances and capacitances is obtained. The entire battery is represented by an equivalent circuit in which the solution resistance and a parallel circuit of the negative electrode and the positive electrode are connected in series. By performing a fitting calculation on the Nyquist diagram measured using this equivalent circuit, the resistance components and the capacitance components can be estimated. The positive electrode resistance is equal to the diameter of a semicircle on the low frequency side in the obtained Nyquist diagram. As seen above, the positive electrode resistance can be estimated by measuring the AC impedance of the prepared positive electrode and performing a fitting calculation on the obtained Nyquist diagram using the equivalent circuit.

EXAMPLES

Now, using Examples, the present invention will be described in detail. However, the present invention is not limited thereto. Positive electrode active materials obtained according to the present embodiment, and positive electrode mixture material pastes and nonaqueous electrolyte secondary batteries using these positive electrode active materials were measured for the performance thereof (paste stability, initial discharge capacity, positive electrode resistance, discharge capacity retention rate). In Examples below, special-grade chemicals available from FUJIFILM Wako Pure Chemical Corporation were used to prepare composite hydoxides, positive electrode active materials, and secondary batteries.

Production and Evaluation of Secondary Batteries

The obtained positive electrode active materials for non-aqueous electrolyte secondary batteries were evaluated by producing secondary batteries as described below and measuring battery characteristics thereof.

Production of Secondary Batteries

Figure 5:
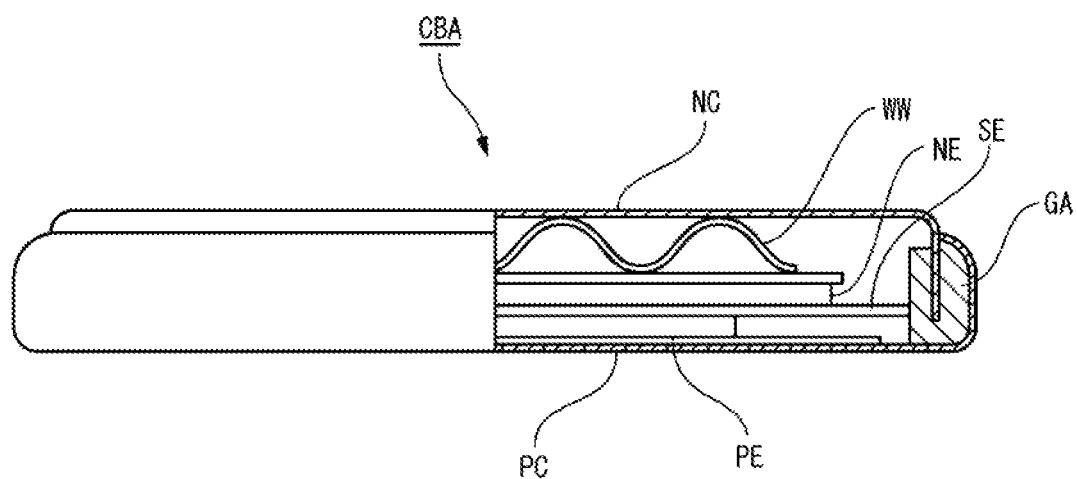
FIG. 5 is a schematic sectional view of a coin secondary battery used for battery evaluation.

Fifty-two point five mg of a positive electrode active material for nonaqueous electrolyte secondary batteries, 15 mg of acetylene black, and 7.5 mg of polytetrafluoroethylene (PTFE) were mixed and pressed at a pressure of 100 MPa to obtain a positive electrode PE (evaluation electrode) having a diameter of 11 mm and a thickness of 100 μm. The obtained positive electrode PE was dried in a vacuum drier at 120° C. for 12 h. Using the positive electrode PE, a 2032-type coin battery as shown in FIG. 5 was produced in an Ar-atmosphere glove box in which the dew point was controlled to −80° C.

Used as a negative electrode NE was a negative electrode sheet formed by applying a graphite powder having an average particle diameter of about 20 μm and polyvinylidene fluoride to a punched-out, disc-shaped copper foil having a diameter of 14 mm. Used as an electrolyte solution was an equal amount mixed solution of ethylene carbonate (EC) and diethyl carbonate (DEC) using IM of LiPF$_6$ as a supporting electrolyte (available from TOMIYAMA PURE CHEMICAL INDUSTRIES, Ltd.). Used as a separator SE was a 25 μm-thick porous polyethylene film. The coin battery CBA also included a gasket GA, a waved washer WW, a positive electrode can PC, and a negative electrode can NC. The initial discharge capacity and the positive electrode resistance indicating the performance of the produced coin battery CBA were evaluated as follows.

Initial Discharge Capacity

The produced coin battery CBA was left alone for about 24 h. After an open circuit voltage (OCV) was stabilized, the current density with respect to the positive electrode was set to 0.1 mA/cm$^2$, and the coin battery CBA was charged to a cut-off voltage of 4.3 V. After being left at rest for one h, the coin battery CBA 1 was discharged to a cut-off voltage 3.0 V, and the then capacity thereof was used as the initial discharge capacity.

Positive Electrode Resistance

The produced coin battery CBA was charged at a charge potential of 4.1 V and measured using a frequency response analyzer and a potentio-galvanostat (1255B available from Solartron Analytical) and using an AC impedance method. Thus, a Nyquist plot shown in FIG. 4 was obtained. This Nyquist plot represents the sum of characteristic curves showing the solution resistance, the resistance and capacitance of the negative electrode, and the resistance and capacitance of the positive electrode. For this reason, by performing a fitting calculation using an equivalent circuit based on this Nyquist plot, the positive electrode resistance value was calculated.

Cycle Characteristics

Cycle characteristics (discharge capacity retention rate) were evaluated using the capacity retention rate after a cycle test. The cycle test was conducted as follows: the initial discharge capacity was measured with the coin battery CBA held at 60° C.; then the coin battery CBA was left at rest for 10 min; and charges and discharges including initial discharge capacity measurements as done in the above initial discharge capacity measurement were repeated in 500 cycles; and the discharge capacity in the 500-th cycle was measured, and the percentage of the discharge capacity in the 500-th cycle to the discharge capacity in the 1st cycle (initial discharge capacity) was obtained as the capacity retention rate (%).

pH Measurement

Five g of each positive electrode active material was dispersed in 100 ml of pure water and left to stand for 10 min, and the pH at 25° C. of the resulting supernatant fluid was measured.

Viscosity Stability of Paste

Twenty-five point zero g of each positive electrode active material, 1.5 g of a conductive material carbon powder, and 2.9 g of polyvinylidene fluoride (PVDF) were mixed using a planetary movement kneader to obtain a positive electrode mixture material paste. The obtained paste was stored for 76 h and then evaluated for the viscosity ratio between before and after storage (paste viscosity after 76-h storage/paste viscosity immediately after production). The viscosity was measured using a vibration viscometer (VM10A available from SEKONIC CORPORATION).

Water Content

The water content of each positive electrode active material was measured at a vaporization temperature of 300° C. using a Karl Fischer moisture meter.

X-Ray Diffraction

Each positive electrode active material was measured with Cu (monochromatized CuKα1 radiation) used as a target at a voltage of 40 kV and a current of 40 mA using a monochrome X-ray diffraction (XRD) device (D8 DISCOVER Vario-1 available from Bruker Japan K.K.).

Example 1

A fired powder (base material) was obtained using a known technology which involves mixing a hydroxide powder containing Ni as a main component obtained by performing crystallization in separated nucleus formation and particle growth steps and changing the atmosphere from an oxidizing atmosphere to a non-oxidizing atmosphere, and lithium hydroxide and firing the mixture. The obtained fired powder (base material) was a fired powder of a lithium-metal composite oxide represented by $Li_{1.20}Ni_{0.35}Co_{0.35}Mn_{0.30}O_2$ and having an average particle size of 5.1 μm and [(d90-d10)/average particle size] of 0.55. This fired powder (base method) was embedded in a resin, and arbitrarily (randomly) selected 20 or more secondary particles were cross-sectionally observed using a 5000× scanning electron microscope and image-analyzed. Thus, the porosity was measured as 35%.

Figure 6:
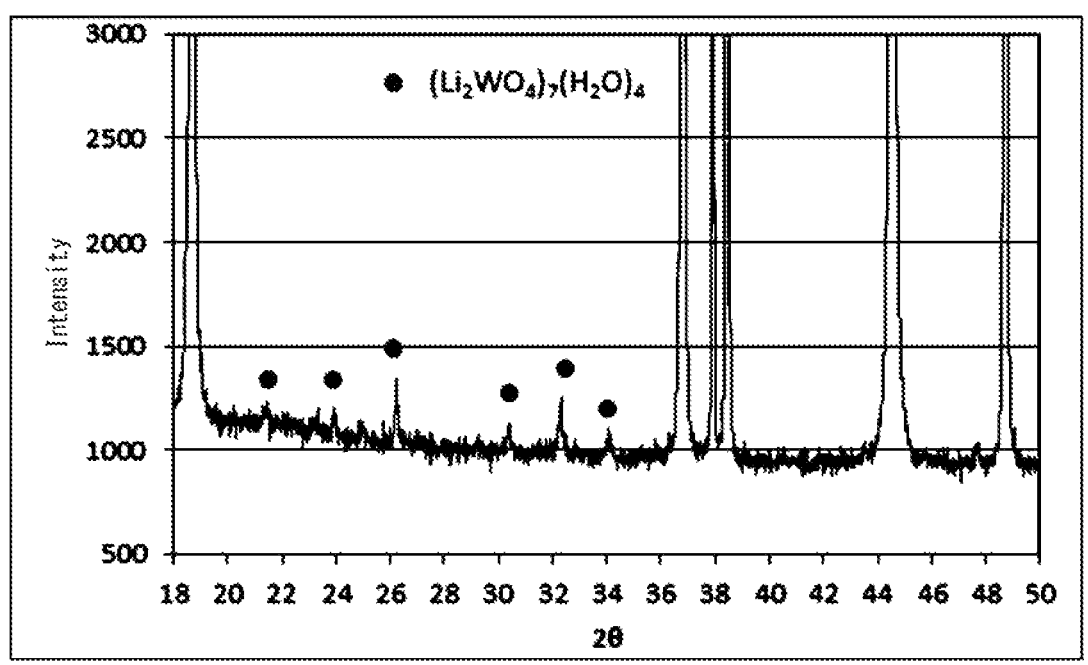
FIG. 6 is a diagram showing an XRD pattern of a positive electrode active material for nonaqueous electrolyte secondary batteries obtained in a first embodiment.

To the fired powder (base material) was added tungsten oxide (available from NIPPON INORGANIC COLOUR & CHEMICAL CO., LTD) serving as a first compound (oxide) and mixed. The tungsten oxide was added in an amount such that the amount of tungsten in the tungsten oxide with respect to the sum of Ni, Co, and Mn included in the fired powder (base material) is 0.2 percent by mol. Water was added to the mixture of the fired powder (base material) and the tungsten oxide in an amount of 10 percent by mass with respect to the fired powder (base material) and mixed. Then, the mixture was dried at 150° C. for 12 h to prepare a positive electrode active material. When the obtained positive electrode active material was observed using a scanning electron microscope, a compound including tungsten was found to be formed on the surface of the particles of the lithium-metal composite oxide. This compound was deemed to be a lithium-tungsten compound. FIG. 6 shows an XRD pattern of the obtained positive electrode active material. The XRD pattern reveals that a lithium-tungsten compound (second compound) is formed. Also, the tungsten oxide (first compound) used as a raw-material was not detected in the XRD pattern. The evaluation results of the positive electrode active material are shown in Table 1.

Evaluation of Battery

A coin secondary battery including a positive electrode produced using the obtained positive electrode active material was evaluated for battery characteristics. The evaluation results of the secondary battery are shown in Table 1.

Example 2

A positive electrode active material was obtained as in Example 1 except that tungsten oxide containing 0.04 percent by mol of tungsten was added, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 3

A positive electrode active material was obtained as in Example 1 except that tungsten oxide containing 0.84 percent by mol of tungsten was added, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 4

A positive electrode active material was obtained as in Example 1 except that water was added in an amount of 1 percent by mass, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 5

A positive electrode active material was obtained as in Example 1 except that water was added in an amount of 30 percent by mass, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 6

A positive electrode active material was obtained as in Example 1 except that water was added in an amount of 7 percent by mass, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 7

A positive electrode active material was obtained as in Example 1 except that water was added in an amount of 15 percent by mass, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Example 8

A positive electrode active material was obtained as in Example 1 except that water was added in an amount of 35 percent by mass, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Comparative Example 1

A positive electrode active material was obtained as in Example 1 except that tungsten oxide or water was not added, and then evaluated. The evaluation results are shown in Table 1.

Comparative Example 2

A positive electrode active material for nonaqueous electrolyte secondary batteries was obtained as in Example 1 except that tungsten oxide containing 0.02 percent by mol of tungsten was added, and then evaluated. When the obtained positive electrode active material was observed using a scanning electron microscope, a compound including tungsten was not found to be formed on the surface of the particles of the lithium-metal composite oxide. The evaluation results are shown in Table 1.

Comparative Example 3

A positive electrode active material was obtained as in Example 1 except that tungsten oxide containing 1.3 percent by mol of tungsten was added, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Comparative Example 4

A positive electrode active material was obtained as in Example 1 except that $Li_{1.00}Ni_{0.35}Co_{0.35}Mo_{0.30}O_2$ was used as a fired powder serving as a base material, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Comparative Example 5

A positive electrode active material was obtained as in Example 1 except that $Li_{1.30}Ni_{0.35}Co_{0.35}Mo_{0.30}O_2$ was used as a fired powder serving as a base material, and then evaluated. When the obtained positive electrode active material was observed using a scanning electron microscope, a compound including tungsten was found to be formed on the surface of the particles of the lithium-metal composite oxide. This compound was deemed to be a lithium-tungsten compound. The evaluation results are shown in Table 1.

Comparative Example 6

A positive electrode active material was obtained as in Example 1 except that water was not added and the mixture was used as a positive electrode active material without drying it, and then evaluated. When the obtained positive electrode active material was observed using a scanning electron microscope, this material was found to be a mixture of a composite oxide powder and a tungsten oxide powder. The evaluation results are shown in Table 1.

TABLE 1

|  | Fired powder Li/Me | First compound Type | First compound Added amount [mol %] | Water Added amount [wt %] | Positive electrode active material pH | Positive electrode active material Water content [wt %] | Positive electrode active material d90/d50 | Paste Viscosity ratio | Secondary battery Initial discharge capacity [mAh/g] | Secondary battery Positive electrode resistance [Ω] | Secondary battery Discharge capacity retention rate [%] |
|---|---|---|---|---|---|---|---|---|---|---|---|
| Example 1 | 1.2 | Tungstic oxide | 0.2 | 10 | 11.6 | 0.12 | 1.24 | 0.81 | 154.5 | 3.79 | 90.8 |
| Example 2 | 1.2 | Tungstic oxide | 0.04 | 10 | 11.8 | 0.13 | 1.23 | 0.91 | 154.1 | 3.98 | 90.3 |
| Example 3 | 1.2 | Tungstic oxide | 0.84 | 10 | 11.3 | 0.13 | 1.26 | 0.74 | 151.7 | 3.57 | 91.1 |
| Example 4 | 1.2 | Tungstic oxide | 0.2 | 1 | 11.7 | 0.11 | 1.25 | 0.78 | 154.3 | 3.91 | 90.6 |
| Example 5 | 1.2 | Tungstic oxide | 0.2 | 30 | 11.4 | 0.16 | 1.28 | 0.75 | 154.7 | 3.72 | 90.4 |
| Example 6 | 1.2 | Tungstic oxide | 0.2 | 7 | 11.7 | 0.13 | 1.25 | 0.80 | 153.5 | 3.85 | 91.0 |
| Example 7 | 1.2 | Tungstic oxide | 0.2 | 15 | 11.7 | 0.14 | 1.24 | 0.78 | 153.3 | 3.78 | 90.2 |
| Example 8 | 1.2 | Tungstic oxide | 0.2 | 35 | 11.7 | 0.17 | 1.35 | 0.76 | 153.4 | 4.09 | 89.1 |

TABLE 1-continued

|  | Fired powder Li/Me | First compound Type | Added amount [mol %] | Water Added amount [wt %] | pH | Positive electrode active material Water content [wt %] | d90/d50 | Paste Viscosity ratio | Secondary battery Initial discharge capacity [mAh/g] | Positive electrode resistance [Ω] | Discharge capacity retention rate [%] |
|---|---|---|---|---|---|---|---|---|---|---|---|
| Comparative Example 1 | 1.2 | — | 0 | 0 | 12 | 0.09 | 1.24 | 6.1 | 153.8 | 4.59 | 89.3 |
| Comparative Example 2 | 1.2 | Tungstic oxide | 0.02 | 10 | 12 | 0.12 | 1.25 | 6.0 | 153.7 | 4.32 | 90.5 |
| Comparative Example 3 | 1.2 | Tungstic oxide | 1.3 | 10 | 10.9 | 0.13 | 1.23 | 0.57 | 149.2 | 3.92 | 89.3 |
| Comparative Example 4 | 1.0 | Tungstic oxide | 0.2 | 10 | 10.9 | 0.11 | 1.25 | 0.55 | 166.6 | 5.29 | 84.3 |
| Comparative Example 5 | 1.3 | Tungstic oxide | 0.2 | 10 | 11.7 | 0.14 | 1.24 | 0.85 | 136.1 | 4.32 | 93.1 |
| Comparative Example 6 | 1.2 | Tungstic oxide | 0.2 | 0 | 11.8 | 0.10 | 1.24 | 1.53 | 154.0 | 4.15 | 90.7 |

Evaluation

The secondary batteries using the positive electrode active materials of Examples showed good results with respect to all of the initial discharge capacity, the positive electrode resistance, and the discharge capacity retention rate. Also, the observations using the scanning electron microscope revealed that the compounds deemed to be lithium-tungsten compounds are formed on the surface of the particles of the positive electrode active materials (lithium-metal composite oxide). The viscosity ratios of the positive electrode mixture material pastes of Examples slightly fell below 1 and were not significantly increased. That is, the positive electrode mixture material pastes of Examples were found to have stable viscosity without being gelled. Note that with respect to Example 8, a small amount of agglomerated particles was found to be present, and d90/d50 was slightly greater than those of the other Examples 1 to 7. Consequently, Example 8 showed slightly higher positive electrode resistance and slightly lower discharge capacity retention rate than the other Examples.

On the other hand, with respect to the positive electrode active material of Comparative Example 1, where tungsten oxide or water was not mixed, the pH when dispersed in pure water exceeded 11.9. The viscosity of the positive electrode mixture material paste using this positive electrode active material was significantly increased. With respect to the positive electrode active material of Comparative Example 2, the amount of tungsten oxide added was small. For this reason, the pH when dispersed in pure water exceeded 11.9, and the viscosity of the positive electrode mixture material paste using this positive electrode active material was significantly increased, as in Comparative Example 1. As for the secondary battery using the positive electrode active material of Comparative Example 2, the positive electrode resistance was higher than those of Examples, and the output characteristics were not improved much.

With respect to the positive electrode active material of Comparative Example 3, where a large amount of tungsten oxide was added, the pH when dispersed in pure water was as low as less than 11, and a greater amount of lithium than necessary seemed to have been drawn out from the lithium-metal composite oxide. The secondary battery using the positive electrode active material of Comparative Example 3 showed low initial discharge capacity. Also, the positive electrode mixture material paste of Comparative Example 3 had a very low viscosity ratio and cannot be said to have had stable viscosity.

With respect to the positive electrode active material of Comparative Example 4, which had a low Li/Me ratio, the pH when dispersed in pure water was low, and the viscosity ratio was very low. Also, the paste thereof cannot be said to have had stable viscosity. Further, the secondary battery using the positive electrode active material of Comparative Example 4 showed high positive electrode resistance and poor output characteristics. With respect to the positive electrode active material of Comparative Example 5, which had a high Li/Me ratio, excess lithium remained in the lithium-metal composite oxide, and the initial discharge capacity was low. The positive electrode resistance was relatively high, and the output characteristics were not improved much.

With respect to the positive electrode active material of Comparative Example 6, where water was not added when mixing tungsten oxide, formation of a compound including tungsten by reaction with an unreacted lithium compound or excess lithium was not found. The paste of Comparative Example 6 had a lower viscosity ratio than the paste of Comparative Example 1, but this paste had a higher viscosity ratio than the pastes of Examples, where water wad added, and cannot be said to have had sufficiently stable viscosity. The positive electrode resistance was relatively high, and the output characteristics were not improved much.

Example 9

A positive electrode active material was obtained as in Example 1 except that instead of tungsten oxide, molybdenum oxide (available from NIPPON INORGANIC COLOUR & CHEMICAL CO., LTD) containing 0.34 percent by mol of molybdenum was added as an oxide, and then evaluated. The evaluation results are shown in Table 2.

Example 10

A positive electrode active material was obtained as in Example 1 except that instead of tungsten oxide, vanadium oxide (available from NIPPON INORGANIC COLOUR & CHEMICAL CO., LTD) containing 0.4 percent by mol of vanadium was added as an oxide, and then evaluated. The evaluation results are shown in Table 2.

TABLE 2

| | Fired powder Li/Me | First compound Type | First compound Added amount [mol %] | Water Added amount [wt %] | Positive electrode active material pH | Positive electrode active material Water content [wt %] | Paste Viscosity ratio | Secondary battery Initial discharge capacity [mAh/g] | Secondary battery Positive electrode resistance [Ω] | Secondary battery Discharge capacity retention rate [%] |
|---|---|---|---|---|---|---|---|---|---|---|
| Example 9 | 1.2 | $MoO_3$ | 0.34 | 10 | 11.5 | 0.11 | 0.76 | 153.1 | 3.53 | 90.2 |
| Example 10 | 1.2 | $V_2O_5$ | 0.4 | 10 | 11.6 | 0.12 | 0.83 | 155.0 | 3.86 | 90.4 |

Evaluation

The positive electrode active materials of Examples 9 and 10 used molybdenum oxide and vanadium oxide, respectively, as first compounds (oxide). As in the case where tungsten oxide was used, it was found that the pH of these positive electrode active materials when dispersed in pure water can be controlled within 11 or more and 11.9 or less and that controlling the pH within this range allows the viscosity of the positive electrode mixture material pastes to be stabilized. Also, the secondary batteries using the positive electrode active materials of these Examples showed good results with respect to all of the initial discharge capacity, the positive electrode resistance, and the discharge capacity retention rate.

In the following Examples and Comparative Examples, molybdenum oxide was used as a first compound (oxide). The above Examples 1 to 10 and Comparative Examples 1 to 6 reveal that the pH when dispersed in pure water and the viscosity ratio of each positive electrode paste are related to each other and that controlling the pH of each positive electrode active material within 11 or more and 11.9 or less allows the paste viscosity to be stabilized. For this reason, in Examples and Comparative Examples below, the pH when dispersing each positive electrode active material in pure water was measured, but the paste viscosity was not measured.

Example 11

A positive electrode active material was obtained as in Example 1 except that instead of tungsten oxide, molybdenum oxide (available from NIPPON INORGANIC COLOUR & CHEMICAL CO., LTD) containing 0.07 percent by mol of molybdenum was added as a first compound (oxide), and then evaluated. The evaluation results are shown in Table 3.

Example 12

A positive electrode active material was obtained as in Example 1 except that instead of tungsten oxide, molybdenum oxide (available from NIPPON INORGANIC COLOUR & CHEMICAL CO., LTD) containing 0.34 percent by mol of molybdenum was added as a first compound (oxide) and water was added in an amount of 1 percent by mass, and then evaluated. The evaluation results are shown in Table 3.

Example 13

A positive electrode active material was obtained as in Example 1 except that instead of tungsten oxide, molybdenum oxide (available from NIPPON INORGANIC COLOUR & CHEMICAL CO., LTD) containing 0.34 percent by mol of molybdenum was added as a first compound (oxide) and water was added in an amount of 30 percent by mass, and then evaluated. The evaluation results are shown in Table 3.

Comparative Example 7

A positive electrode active material for nonaqueous electrolyte secondary batteries was obtained as in Example 1 except that instead of tungsten oxide, molybdenum oxide (available from NIPPON INORGANIC COLOUR & CHEMICAL CO., LTD) containing 0.03 percent by mol of molybdenum was added as a first compound (oxide), and then evaluated. The evaluation results are shown in Table 3.

Comparative Example 8

A positive electrode active material for nonaqueous electrolyte secondary batteries was obtained as in Example 1 except that instead of tungsten oxide, molybdenum oxide (available from NIPPON INORGANIC COLOUR & CHEMICAL CO., LTD) containing 1.36 percent by mol of molybdenum was added as a first compound (oxide), and then evaluated. The evaluation results are shown in Table 3.

Comparative Example 9

A positive electrode active material for nonaqueous electrolyte secondary batteries was obtained as in Example 1 except that instead of tungsten oxide, molybdenum oxide (available from NIPPON INORGANIC COLOUR & CHEMICAL CO., LTD) containing 2.04 percent by mol of molybdenum was added as a first compound (oxide), and then evaluated. The evaluation results are shown in Table 3.

Comparative Example 10

A positive electrode active material for nonaqueous electrolyte secondary batteries was obtained as in Example 1 except that $Li_{1.00}Ni_{0.35}Co_{0.35}Mn_{0.30}O_2$ was used as a fired powder (base material) and, instead of tungsten oxide, molybdenum oxide containing 0.34 percent by mol of molybdenum was added, and then evaluated. The evaluation results are shown in Table 3.

Comparative Example 11

A positive electrode active material for nonaqueous electrolyte secondary batteries was obtained as in Example 1 except that $Li_{1.30}Ni_{0.35}Co_{0.35}Mn_{0.30}O_2$ was used as a fired powder (base material) and, instead of tungsten oxide, molybdenum oxide containing 0.34 percent by mol of molybdenum was added, and then evaluated. The evaluation results are shown in Table 3.

TABLE 3

| | Fired powder Li/Me | First compound Type | Water | Positive electrode active material | | Secondary battery | | |
|---|---|---|---|---|---|---|---|---|
| | | | Added amount [mol %] | Added amount [wt %] | pH | Water content [wt %] | Initial discharge capacity [mAh/g] | Positive electrode resistance [Ω] | Discharge capacity retention rate [%] |
| Example 9 | 1.2 | $MoO_3$ | 0.34 | 10 | 11.5 | 0.11 | 153.1 | 3.53 | 90.2 |
| Example 11 | 1.2 | $MoO_3$ | 0.07 | 10 | 11.8 | 0.13 | 153.2 | 3.87 | 90.6 |
| Example 12 | 1.2 | $MoO_3$ | 0.34 | 1 | 11.6 | 0.1 | 152.9 | 3.69 | 90.8 |
| Example 13 | 1.2 | $MoO_3$ | 0.34 | 30 | 11.3 | 0.17 | 153.2 | 3.49 | 90.1 |
| Comparative Example 1 | 1.2 | $MoO_3$ | 0 | 0 | 12 | 0.09 | 153.3 | 4.59 | 89.9 |
| Comparative Example 7 | 1.2 | $MoO_3$ | 0.03 | 10 | 12 | 0.13 | 153.3 | 4.28 | 90.3 |
| Comparative Example 8 | 1.2 | $MoO_3$ | 1.36 | 10 | 9.8 | 0.12 | 150.3 | 3.36 | 91.0 |
| Comparative Example 9 | 1.2 | $MoO_3$ | 2.04 | 10 | 8.7 | 0.14 | 147.4 | 3.69 | 89.7 |
| Comparative Example 10 | 1.0 | $MoO_3$ | 0.34 | 10 | 9.5 | 0.12 | 162.7 | 5.05 | 83.2 |
| Comparative Example 11 | 1.3 | $MoO_3$ | 0.34 | 10 | 11.7 | 0.15 | 135.8 | 4.28 | 92.1 |

Evaluation

To facilitate comparison, Table 3 also shows Example 9 and Comparative Example 1. Examples 11 to 13 used molybdenum oxide as a first compound (oxide) and were found to have been able to control the pH when dispersed in pure water within 11 or more and 11.9 or less. The secondary batteries using these positive electrode active materials showed good results with respect to all of the initial discharge capacity, the positive electrode resistance, and the discharge capacity retention rate.

On the other hand, with respect to the positive electrode active materials of Comparative Examples 8 to 10, the pH when dispersed in pure water fell below 11 or exceeded 11.9. The secondary batteries using these positive electrode active materials were found to show poorer evaluation results than those of Examples with respect to any one of the initial discharge capacity, the positive electrode resistance, and the discharge capacity retention rate.

The contents of Japanese Patent Application Nos. 2015-212239, 2016-035788, and 2016-166489 and all documents cited in the above embodiment or the like are incorporated herein by reference as a part of the present description to the extent permitted by law.

DESCRIPTION OF REFERENCE SIGNS

10 . . . positive electrode active material
1 . . . composite oxide powder
2 . . . primary particle
3 . . . secondary particle
4 . . . pore
A . . . second compound
CBA . . . coin battery
PE . . . positive electrode (evaluation electrode)
NE . . . negative electrode
SE . . . separator
GA . . . gasket
PC . . . positive electrode can
NC . . . negative electrode can

The invention claimed is:

1. A positive electrode active material for nonaqueous electrolyte secondary batteries, the positive electrode active material being formed of a lithium-metal composite oxide powder having a layered crystal structure, wherein
   the lithium-metal composite oxide powder comprises:
      secondary particles represented by a general formula (2) $Li_sNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles; and
      a second compound including lithium,
   the second compound is present at least on a surface of the primary particles that is exposed on an outer surface of the secondary particles,
   the second compound is formed by reaction of a first compound in solid state on the surface of the primary particles with lithium ions in the presence of water, the lithium ions having been eluted from the secondary particles, and the first compound being at least one selected from a group consisting of a lithium-free oxide, a hydrate of the oxide, and a lithium-free inorganic acid salt,
   pH at 25° C. of a supernatant fluid obtained by dispersing 5 g of the positive electrode active material in 100 ml of pure water and leaving a resulting solution to stand for 10 min is measured as 11 or more and 11.9 or less, and
   the second compound is a crystalline compound detectable by an x-ray diffraction (XRD) method.

2. The positive electrode active material for nonaqueous electrolyte secondary batteries of claim 1, wherein
   an average particle size is in a range of 3 μm or more and 15 μm or less, and
   [(d90−d10)/average particle size] which is an index indicating a width of a particle size distribution is 0.7 or less.

3. The positive electrode active material for nonaqueous electrolyte secondary batteries of claim 1, wherein a percentage of an area occupied by pores measured by a cross-sectional observation of the lithium-metal composite oxide powder is 4.5% or more and 60% or less with respect to entire cross-sectional areas of all the composite oxide powder particles.

4. The positive electrode active material for nonaqueous electrolyte secondary batteries of claim 1, wherein the amount of elements other than lithium and oxygen included in the second compound is 0.03 percent by mol or more and 1.2 percent by mol or less with respect to a sum of Ni, Co, Mn, and M in the lithium-metal composite oxide powder.

5. The positive electrode active material for nonaqueous electrolyte secondary batteries of claim 1, wherein the ratio of d90 to d50 (d90/d50) obtained from a volume integrated value in a particle size distribution measured using laser diffraction/scattering is less than 1.35.

6. A positive electrode mixture material paste for nonaqueous electrolyte secondary batteries, the positive electrode mixture material paste comprising the positive electrode active material for nonaqueous electrolyte secondary batteries of claim 1.

7. A nonaqueous electrolyte secondary battery comprising a positive electrode comprising the positive electrode active material for nonaqueous electrolyte secondary batteries of claim 1.

8. A positive electrode active material for nonaqueous electrolyte secondary batteries, the positive electrode active material being formed of a lithium-metal composite oxide powder having a layered crystal structure, wherein
the lithium-metal composite oxide powder comprises:
secondary particles represented by a general formula (2) $Li_sNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles; and
a second compound including lithium,
the second compound is a compound that is present on a surface of the primary particles and that is formed by reaction of a first compound with lithium ions in the presence of water, the lithium ions having been eluted from the secondary particles, and the first compound being at least one selected from a group consisting of a lithium-free oxide, a hydrate of the oxide, and a lithium-free inorganic acid salt,
the second compound includes at least one selected from the group consisting of lithium molybdate, lithium vanadate, lithium niobate, lithium stannate, lithium manganate, lithium ruthenate, lithium rhenate, lithium tantalate, lithium phosphate, and lithium borate,
pH at 25° C. of a supernatant fluid obtained by dispersing 5 g of the positive electrode active material in 100 ml of pure water and leaving a resulting solution to stand for 10 min is measured as 11 or more and 11.9 or less, and
the second compound is a crystalline compound detectable by an x-ray diffraction (XRD) method.

9. A method for producing the positive electrode active material of claim 1 for nonaqueous electrolyte secondary batteries, the method comprising:
mixing a fired powder formed of a lithium-metal composite oxide having a layered crystal structure, a first compound which is at least one selected from a group consisting of a lithium-free oxide, a hydrate of the oxide, and a lithium-free inorganic acid salt, and water; and
drying a mixture resulting from the mixing, wherein
the fired powder comprises secondary particles represented by a general formula (1) $Li_sNi_{1-x-y-z}Co_xMn_yM_zO_{2+\alpha}$ where $0.055 \leq x \leq 0.35$; $0 \leq y \leq 0.35$; $0 \leq z \leq 0.10$; $1.00 < s < 1.30$; $0 \leq \alpha \leq 0.2$; and M is at least one element selected from V, Mg, Mo, Nb, Ti, W, and Al and formed by agglomeration of primary particles,
the first compound is a compound that reacts with lithium ions in the presence of water so that a second compound including lithium can be formed, and
a content of the first compound in the mixture is an amount such that pH at 25° C. of a supernatant fluid obtained by dispersing 5 g of a positive electrode active material resulting from the drying in 100 ml of pure water and leaving a resulting solution to stand for 10 min is measured as 11 or more and 11.9 or less.

10. The method for producing a positive electrode active material for nonaqueous electrolyte secondary batteries of claim 9, wherein the lithium-free oxide comprises at least one selected from a group consisting of tungsten oxide, molybdenum oxide, vanadium pentoxide, niobium oxide, tin dioxide, manganese oxide, ruthenium oxide, rhenium oxide, tantalum oxide, phosphorus oxide, and boron oxide.

11. The method for producing a positive electrode active material for nonaqueous electrolyte secondary batteries of claim 9, wherein the first compound comprises at least one selected from tungsten oxide and tungstic acid.

12. The method for producing a positive electrode active material for nonaqueous electrolyte secondary batteries of claim 9, wherein the first compound is mixed into the fired powder and then the water is mixed.

13. The method for producing a positive electrode active material for nonaqueous electrolyte secondary batteries of claim 9, wherein
an average particle size of the fired powder is in a range of 3 μm or more and 15 μm or less, and
[(d90−d10)/average particle size] of the fired powder which is an index indicating a width of a particle size distribution is 0.7 or less.

14. The method for producing a positive electrode active material for nonaqueous electrolyte secondary batteries of claim 9, wherein a percentage of an area occupied by pores measured by a cross-sectional observation of the fired powder is 4.5% or more and 60% or less with respect to an entire cross-sectional area of the fired powder.

15. The method for producing a positive electrode active material for nonaqueous electrolyte secondary batteries of claim 9, wherein
the amount of elements included in the first compound in the mixture and capable of reacting with lithium ions is 0.03 percent by mol or more and 1.2 percent by mol or less with respect to a sum of Ni, Co, Mn, and M in the fired powder.

16. The method for producing a positive electrode active material for nonaqueous electrolyte secondary batteries of claim 9, wherein a content of the water in the mixture is 0.5 percent by mass or more with respect to the fired powder.

17. The method for producing a positive electrode active material for nonaqueous electrolyte secondary batteries of claim 9, wherein the drying is performed at 100° C. or more and 300° C. or less.

* * * * *